(12) United States Patent
Thaker

(10) Patent No.: US 9,255,983 B2
(45) Date of Patent: Feb. 9, 2016

(54) SYSTEMS AND METHODS FOR TRACKING A USER'S LOCATION

(71) Applicant: eBay Inc., San Jose, CA (US)

(72) Inventor: Nikhil Vijay Thaker, Round Rock, TX (US)

(73) Assignee: eBay Inc., San Jose, CA (US)

( * ) Notice: Subject to any disclaimer, the term of this patent is extended or adjusted under 35 U.S.C. 154(b) by 337 days.

(21) Appl. No.: 13/889,074

(22) Filed: May 7, 2013

(65) Prior Publication Data

US 2014/0334264 A1 Nov. 13, 2014

(51) Int. Cl.
- *G01S 3/80* (2006.01)
- *G01S 5/02* (2010.01)
- *H04W 4/04* (2009.01)
- *G01S 19/45* (2010.01)

(52) U.S. Cl.
CPC .............. *G01S 5/0263* (2013.01); *G01S 19/45* (2013.01); *H04W 4/04* (2013.01)

(58) Field of Classification Search
CPC ......... H04W 4/043; H04W 4/04; H04W 4/02; G01S 19/48; G01S 19/45
USPC ....................................................... 367/118
See application file for complete search history.

(56) References Cited

U.S. PATENT DOCUMENTS

| | | | | |
|---|---|---|---|---|
| 8,862,146 B2* | 10/2014 | Shatsky et al. | ............. | 455/456.1 |
| 2009/0228211 A1* | 9/2009 | Rasanen et al. | .................... | 702/1 |
| 2010/0322035 A1* | 12/2010 | Rhoads et al. | ................ | 367/118 |
| 2012/0052872 A1* | 3/2012 | Do | ............. | 455/456.1 |
| 2012/0083285 A1* | 4/2012 | Shatsky et al. | ............. | 455/456.1 |
| 2012/0214515 A1* | 8/2012 | Davis et al. | ................ | 455/456.3 |
| 2012/0214544 A1* | 8/2012 | Shivappa et al. | ............ | 455/556.1 |
| 2014/0285338 A1* | 9/2014 | Davis et al. | ............. | 340/539.13 |
| 2014/0355785 A1* | 12/2014 | Taylor et al. | .................... | 381/92 |
| 2014/0378162 A1* | 12/2014 | Shatsky et al. | ............. | 455/456.1 |

\* cited by examiner

*Primary Examiner* — Mark Hellner
(74) *Attorney, Agent, or Firm* — Schwegman Lundberg & Woessner, P.A.

(57) ABSTRACT

Techniques for tracking a current location of a user are described. According to various embodiments, an ambient noise signal proximate to a user device is detected using a microphone. Audio sample information may be accessed, where the audio sample information identifies various audio samples and, for each of the audio samples, a source of the corresponding audio sample. Thereafter, a specific audio sample corresponding to the ambient noise signal may be identified. Moreover, a current location of the user device may be determined, based on the source of the specific audio sample.

16 Claims, 12 Drawing Sheets

| Audio Sample (Link) | Audio Sample Source | Indoor/Outdoor Source |
|---|---|---|
| Traffic Noise Link | Street | Outdoor |
| Train noiseLink | Street | Outdoor |
| BirdsLink | Street | Outdoor |
| DogsLink | Street | Outdoor |
| Church BellsLink | Church | Outdoor |
| Horse RaceLink | Horse Racing Field | Outdoor |
| Football GameLink | Football Stadium | Outdoor |
| Baseball GameLink | Baseball Stadium | Outdoor |
| Basketball GameLink | Basketball Stadium | Outdoor |
| Music ConcertLink | Concert Arena | Outdoor |
| ... | ... | ... |
| Bowling AlleyLink | Bowling Alley | Indoor |
| Video Game Link | Arcade | Indoor |
| Casino GamesLink | Casino | Indoor |
| Lecture/ClassLink | Lecture Hall/Classroom | Indoor |
| RestaurantLink | Restaurant | Indoor |
| Disco_Link | Disco | Indoor |
| BarLink | Bar | Indoor |
| Car cabinLink | Car cabin | Indoor |
| ChurchLink | Church | Indoor |
| IndoorMusicLink | Auditorium/Concert Hall | Indoor |
| ... | ... | ... |

*Fig. 4*

| POINT OF INTEREST | LOCATION |
|---|---|
| St. Peter's Church<br>Springfield Arena<br>Springfield High School<br>FunTime Arcade<br>MGGM Casino<br>Pete's Bowling Alley<br>John's Chinese Cuisine<br>Springfield Stadium<br>... | [x1, y1]<br>[x2, y2]<br>[x3, y3]<br>[x4, y4]<br>[x5, y5]<br>[x6, y6]<br>[x7, y7]<br>[x8, y8]<br>... |

*Fig. 6*

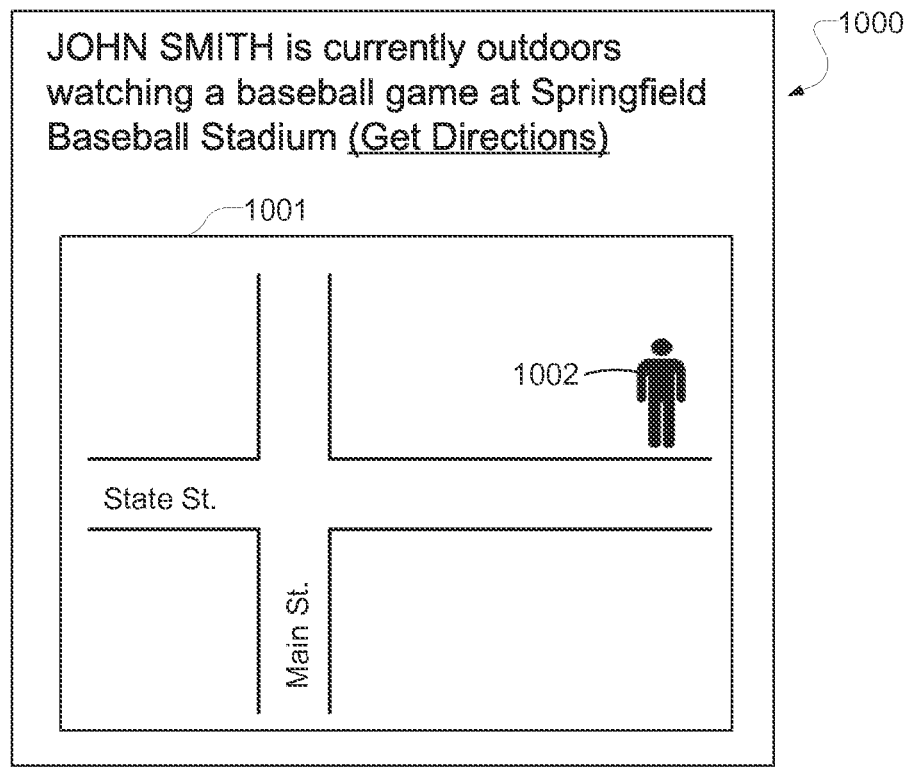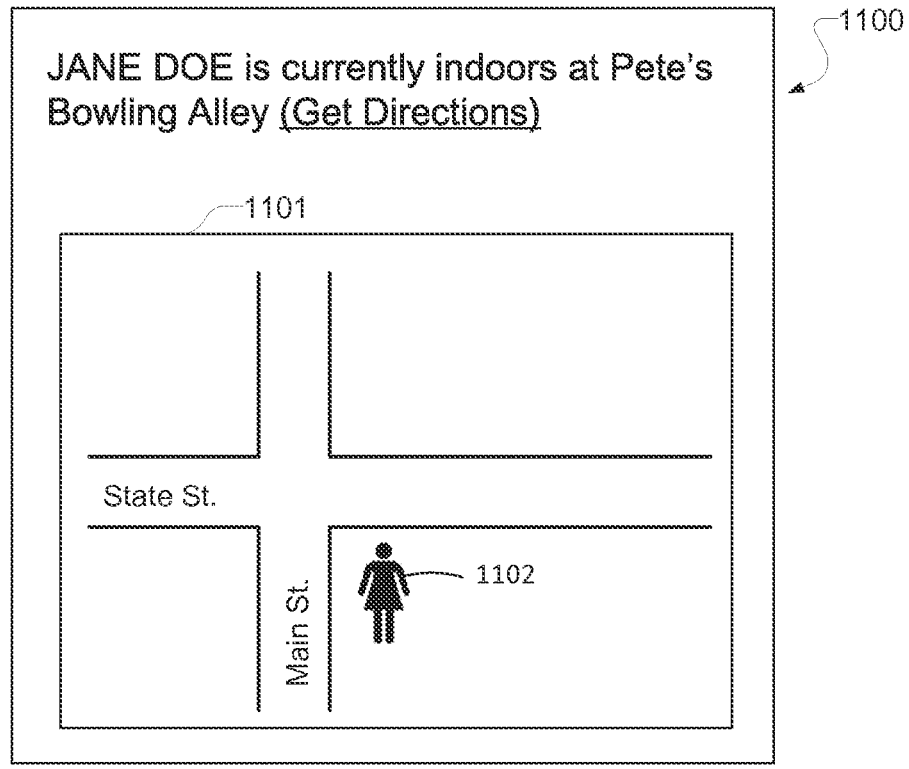
Fig. 10

SYSTEMS AND METHODS FOR TRACKING A USER'S LOCATION

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright eBay, Inc. 2013, All Rights Reserved.

TECHNICAL FIELD

The present application relates generally to data processing systems and, in one specific example, to techniques for tracking a current location of a user.

BACKGROUND

Various applications provide the ability to estimate a location of a mobile device (such as a cell phone or smartphone) using, for example, a global positioning system (GPS) or a Wi-Fi positioning system of the mobile device. For example, some child monitoring mobile applications allow parents to track the location of a child and to check that the child is where they should be by tracking the location of the child's mobile device. Typically, the location of the mobile device will be provided in the format of a street address, or latitude and longitude coordinates.

BRIEF DESCRIPTION OF THE DRAWINGS

Some embodiments are illustrated by way of example and not limitation in the figures of the accompanying drawings in which:

FIG. 4 illustrates an example of audio sample information identifying various audio samples, according to various embodiments;

FIG. 6 illustrates exemplary point of interest information identifying various points of interest, according to various embodiments;

FIG. 10 illustrates various examples of notification messages, according to various embodiments;

DETAILED DESCRIPTION

Figure 1:
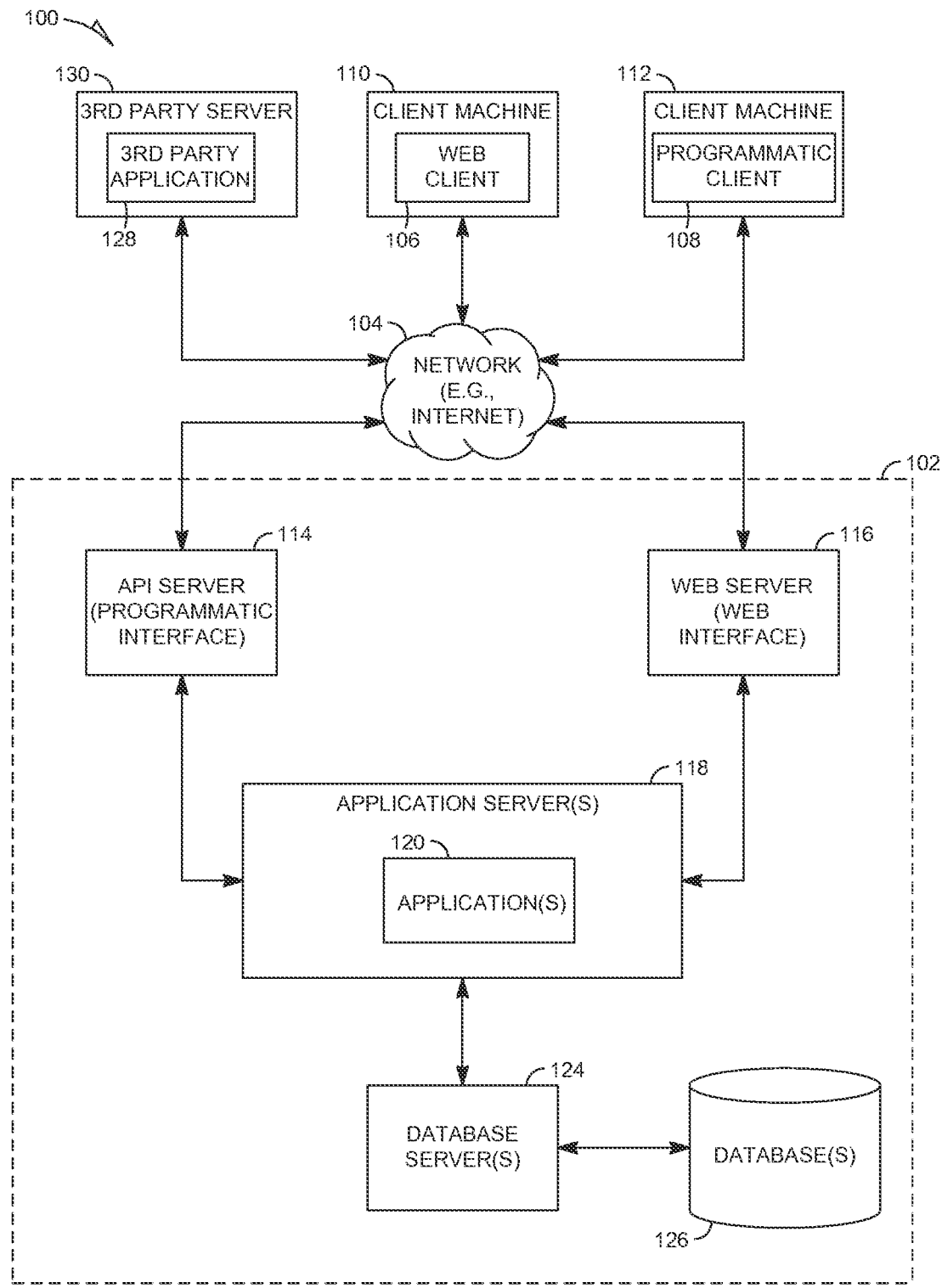
FIG. 1 is a network diagram depicting a client-server system, within which one example embodiment may be deployed.

Example methods and systems for tracking a current location of a user are described. In the following description, for purposes of explanation, numerous specific details are set forth in order to provide a thorough understanding of example embodiments. It will be evident, however, to one skilled in the art that the present invention may be practiced without these specific details.

According to various exemplary embodiments, a current location of a user device (e.g., a cell phone, a smartphone, a tablet computing device, etc.) may be determined by tracking the ambient sounds and the ambient temperature around the device. Conventional geolocation techniques, such as geolocation techniques utilizing a global positioning system (GPS) or Wi-Fi positioning system of a mobile device, may provide a device location in the format of a street address (e.g., a street address corresponding to a shopping mall). The techniques of this disclosure may be utilized to determine device location to a greater degree of specificity. For example, the techniques of this disclosure may be utilized to determine that a device is located indoors or outdoors, or that a device is located within a restaurant of the shopping mall, or inside a bowling alley of the shopping mall, or within a car being driven near the shopping mall, and so on.

According to various exemplary embodiments, a microphone of a device may be utilized to track ambient noises and sounds around the device. The detected sounds may be compared to a library of pre-recorded sounds, like sounds from street noise traffic, a baseball stadium, a bowling alley, a videogame arcade, a casino, a church, a flea market, and so on. Based on the aforementioned comparison, it may be determined that the device is currently located at, for example, a busy street intersection, a baseball stadium, a bowling alley, an arcade, a casino, a church, a flea market, and so on.

According to various exemplary embodiments, a temperature sensor of a device may be utilized to track an ambient temperature around the device. The ambient temperature may then be used to determine whether the device is currently located indoors or outdoors. For example, if the detected ambient temperature is within an expected room temperature range, then it may be determined that the device is currently located indoors. On the other hand, if the detected ambient temperature deviates from an expected room temperature range, then it may be determined that the device is currently located outdoors. Moreover, the detected ambient temperature may be compared with weather reports for the general city or zip code where the phone is located in order to more accurately determine whether the device is currently located indoors or outdoors.

According to various exemplary embodiments, an activity being performed by a user of a device may be inferred based on the current location of the device as determined consistent with various exemplary embodiments. For example, if the device is currently located in a bowling alley, then it may be inferred that the user is participating in a game of bowling, or is a spectator to a game of bowling. As another example, if the device is currently located in a church, then it may be inferred that the user is currently participating in religious services. As another example, if the device is currently located in a baseball stadium, then it may be inferred that the user is currently attending a baseball game.

According to various exemplary embodiments, a notification indicating a current location of the user device and indicating whether the user device is indoors or outdoors may be transmitted to a predetermined address, such as a network address corresponding to a user or communication device. For example, the notification may be a text message (e.g., short message service (SMS) message or multimedia messaging service (MMS) message) that includes a map identifying the current location of the user device, where the message identifies whether the user device is indoors or outdoors. In some embodiments, the notification may indicate an inferred activity being performed by the user of the device.

Thus, various benefits and advantages may be realized. For example, parents may set up their child's smartphone to transmit a text message to the parents every two hours with the current location of the child's phone. For example, suppose that parents drop their child at a friend's house for a birthday party during wintertime. After two hours, if the temperature sensor of the child's phone detects an ambient temperature close to room temperature (indicating that the child is indoors), and if the microphone of the child's phone detects ambient noises of a party (indicating that the child is at a party), then a notification may be transmitted to the parents with an indication that the child is indoors and attending the party. Thus, the parents are able to determine that the child is at the expected location.

As another example, suppose a user's husband promises that he will leave a baseball game early in order to pick up the user's parents from the airport. The husband's smartphone can be setup to transmit a notification one hour before the flight arrives. If the user's husband is driving out of the stadium parking lot one hour before the arrival of the flight, then conventional GPS systems will merely indicate that the husband's device is located at the baseball stadium. Consistent with various embodiments, the temperature sensor of the husband's phone may detect an ambient temperature close to room temperature (indicating that the husband is not outside), and the microphone of the husband's phone may detect ambient car cabin noises (indicating that the husband is driving their car). Thus, a notification may be transmitted to the user with an indication that the husband is driving their car.

FIG. 1 is a network diagram depicting a client-server system 100, within which one example embodiment may be deployed. A networked system 102 provides server-side functionality via a network 104 (e.g., the Internet or Wide Area Network (WAN)) to one or more clients. FIG. 1 illustrates, for example, a web client 106 (e.g., a browser), and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more databases servers 124 that facilitate access to one or more databases 126. According to various exemplary embodiments, the applications 120 may be implemented on or executed by one or more of the modules of the system 200 illustrated in FIG. 2. While the applications 120 are shown in FIG. 1 to form part of the networked system 102, it will be appreciated that, in alternative embodiments, the applications 120 may form part of a service that is separate and distinct from the networked system 102.

Further, while the system 100 shown in FIG. 1 employs a client-server architecture, the present invention is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications of the networked system 102.

Figure 2:
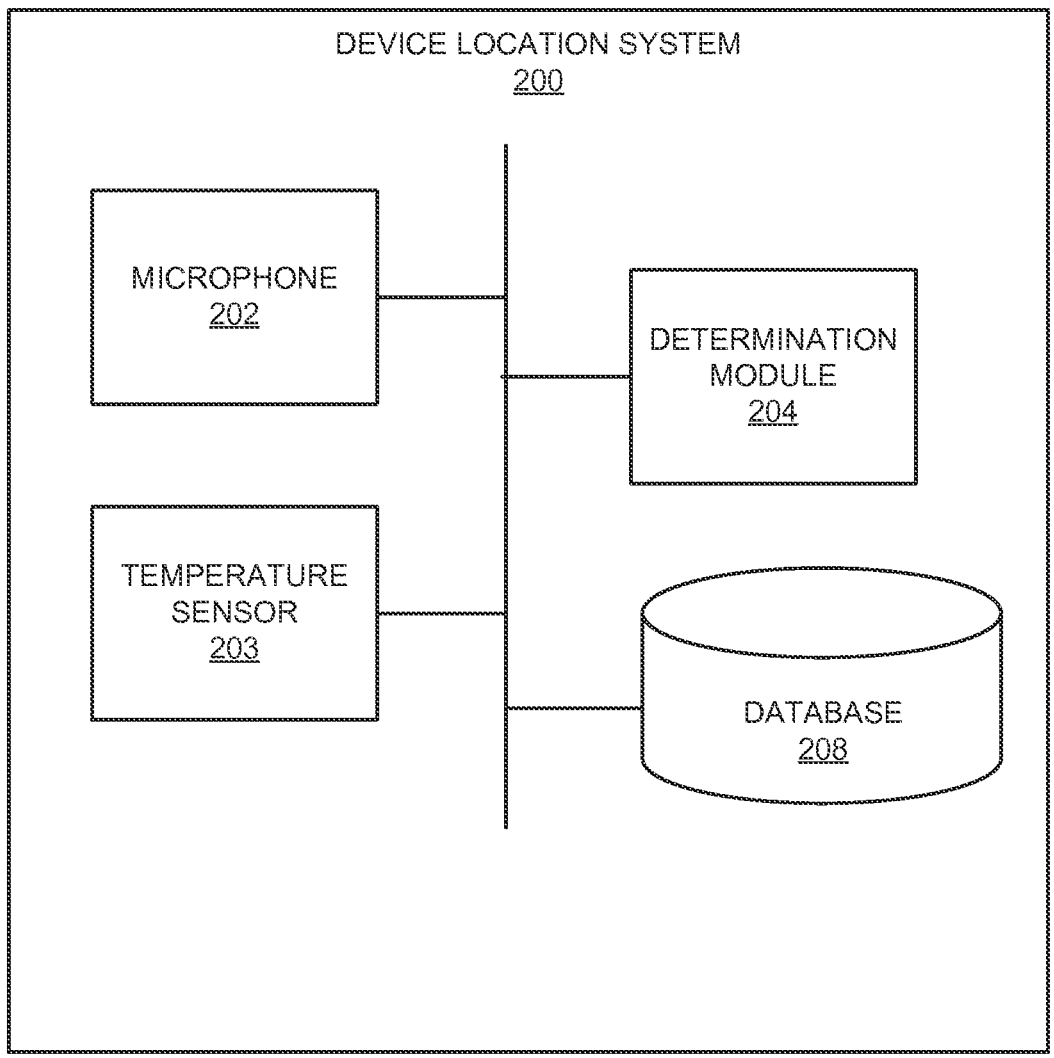
FIG. 2 is a block diagram of an example system, according to various embodiments.

Turning now to FIG. 2, a device location system 200 includes a microphone 202, a temperature sensor 203, a determination module 204, and a database 206. The modules of the device location system 200 may be implemented on or executed by a single device (such as, for example, one of the client machines (e.g., 110, 112) or application server(s) 118 illustrated in FIG. 1), or on separate devices interconnected via a network. Exemplary operations of each of the modules 202-208 of the device location system 200 will now be described in conjunction with FIG. 3.

Figure 3:
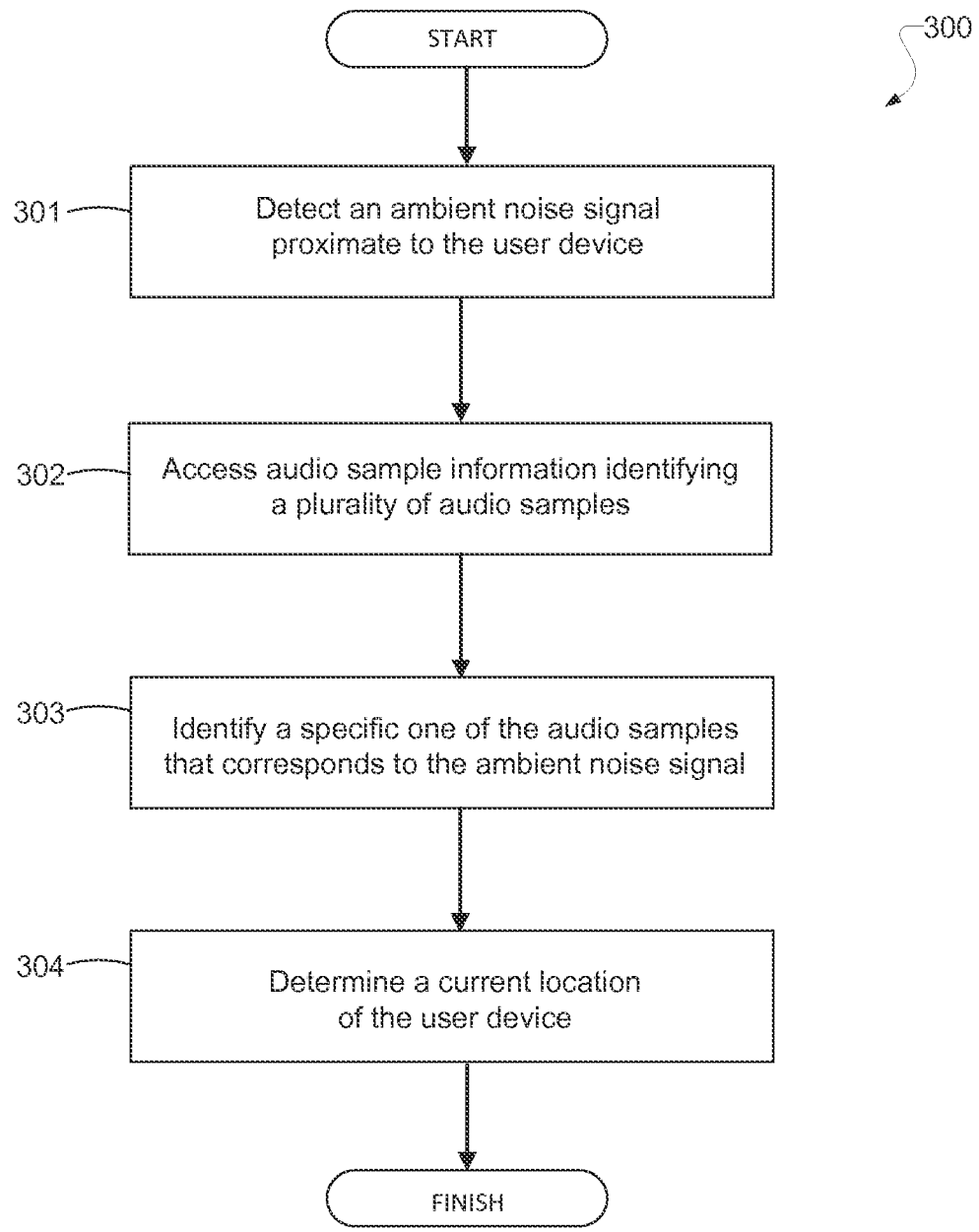
FIG. 3 is a flowchart illustrating an example method, according to various embodiments.

FIG. 3 is a flowchart illustrating an example method 300, according to various exemplary embodiments. The method 300 may be performed at least in part by, for example, the device location system 200 illustrated in FIG. 2 (or an apparatus having similar modules, such as client machines 110 and 112 or application server 118 illustrated in FIG. 1). In operation 301, the microphone 202 detects an ambient noise signal proximate to a user device. In other words, the microphone 202 detects background noise or ambient noise near the user device. The aforementioned user device may correspond to a desktop computer, personal computer, workstation, or a mobile device (e.g., a smartphone, cell phone, laptop computer, notebook computer, tablet computing device, etc.). Accordingly, the microphone 202 may correspond to a conventional microphone installed on the user device, as understood by those skilled in the art. Examples of ambient noises may include noises related to conversations, traffic, trains, church bells, music concerts, sporting events, casinos, restaurants, and so on. In operation 302, the determination module 204 accesses audio sample information identifying various audio samples. According to various exemplary embodiments, the audio sample information may identify, for each of the audio samples, a source of the corresponding audio sample. In some embodiments, the source may correspond to anything or any place that is associated with the audio sample, such as a person, a living organism, an inanimate object, a vehicle, etc., that emitted the noise or is located close to where the noise was emitted and/or recorded, or a place (e.g., a venue, a location, a structure, etc.) that emitted the noise or is close to where the noise was emitted and/or recorded. For example, if an audio sample is the noise of church bells ringing, then the audio sample information may identify the source of this audio sample as a church. As another example, if an audio sample is the noise of a game of 10 pin bowling, then the audio sample information may identify the source of this audio sample as a bowling alley. As yet another example, if the audio sample is the noise of the interior cabin of a car under driving conditions, then the audio sample information may identify the source of this audio sample as a car interior.

FIG. 4 illustrates an example of audio sample information 400 that identifies a number of audio samples (e.g., by including links to various audio samples). Moreover, the audio sample information 400 identifies, for each of the audio samples, a source of the audio sample, and whether the audio sample source is an indoor source or an outdoor source. For example, the audio sample "Music_ConcertLink" has an outdoor source of "Concert Arena", while the audio sample "Bowling_AlleyLink" has an indoor source of "Bowling Alley". The exemplary audio sample information 400 may be stored locally at, for example, the database 208 illustrated in FIG. 2, or may be stored remotely at a database, data repository, storage server, etc., that is accessible by the device location system 200 via a network (e.g., the Internet).

Referring again to FIG. 3, in operation 303, the determination module 204 identifies, from the audio sample information accessed in operation 302, a specific audio sample that corresponds to or matches the ambient noise signal that was detected in operation 301. For example, if the ambient noise signal detected in operation 301 includes the noises of a game of 10 pin bowling being played in a bowling alley, then in operation 303, the determination module 204 will identify a match between the ambient noise signal and an audio sample associated with a bowling alley (e.g., an audio sample of sounds recorded in a bowling alley). According to various exemplary embodiments, the determination module 204 may use any audio matching technique or process understood by those skilled in the art for detecting a match between an audio signal and a pre-recorded audio sample. For example, many services and software applications exist for performing a pattern-matching operation between a recorded audio signal and a library of pre-recorded audio signals. For example, the mobile application Shazam® developed by Shazam Entertainment Ltd. allows a user to record a piece of music through a microphone of a mobile device, and to pattern-match the recording against a library of millions of pre-recorded tracks in order to detect a match between the recorded piece of music and one of the pre-recorded tracks. The techniques of pattern matching are understood by those skilled in the art, and will not be described in further detail in order to avoid obscuring various aspects of the invention.

While various embodiments throughout refer to a "match" between an audio sample and an ambient noise signal, it is not necessary for the determination module 204 to detect an absolute or exact match between the audio sample and the ambient noise signal, in order for the determination module 204 to determine that the audio sample corresponds to or matches the ambient noise signal. For example, operation 303 may comprise detecting that the audio sample closely matches the ambient noise signal, or detecting that the audio sample and the ambient noise signal are similar or have similar aural characteristics, or determining that the extent or degree of similarity between the audio sample and the ambient noise signal is greater than a predetermined threshold, and so on.

Referring back to the method 300 in FIG. 3, in operation 304, the determination module 204 determines a current location of the user device based on the source of the specific audio sample that was identified in operation 303. For example, if the determination module 204 determines (in operation 303) that the ambient noise signal matches an audio sample having a source of a bowling alley, then in operation 304, the determination module 204 may determine that the user device is currently located in a bowling alley. Moreover, if the source of the audio sample in the audio sample information identifies a more specific location (e.g., a particular bowling alley, such as "Pete's Bowling Alley" at 456 State St., Ann Arbor, Mich.), then the determination module 204 may determine that the current location of the user device is "Pete's Bowling Alley" at 456 State St., Ann Arbor, Mich. As illustrated in FIG. 4, the audio sample information may also identify whether each source corresponds to an indoor location or an outdoor location. Accordingly, consistent with some embodiments, the determination of the location of the user device (see operation 304 in FIG. 3) may include determining whether the user device is located indoors or outdoors.

Thus, based on the specificity of the sources identified in the audio sample information, the determination module 204 may identify the location of a user device to varying degrees of specificity. For example, in some embodiments, the sources identified in the audio sample information may refer to general venues or locations, such as a church, a baseball stadium, arcade, and so on. For example, if the audio sample information identifies a source of "Concert Arena" for an audio sample matching an ambient noise signal detected by a user device, then the determination module 204 may determine that the user device is currently located at a "Concert Arena". As another example, if the audio sample information identifies a source of "bowling alley" for an audio sample matching an ambient noise signal detected by a user device, then the determination module 204 may determine that the user device is currently located at a "bowling alley". In some embodiments, the audio sample information may refer to specific venues or locations by name, such as "Yankee Stadium" or "the Vatican". For example, if the source of the audio sample in the audio sample information identifies a more specific location (e.g., a particular bowling alley, such as "Pete's Bowling Alley" at 456 State St., Ann Arbor, Mich.), then the determination module 204 may determine that the current location of the user device is "Pete's Bowling Alley" at 456 State St., Ann Arbor, Mich.

According to various exemplary embodiments, after the determination module 204 determines a current location of the user device, the determination module 204 may transmit a notification (e.g., a text message, such as a multimedia messaging service (MMS) message or short messaging service (SMS) message, instant message, e-mail, content feed update, etc.) identifying the current location of the user device to a predetermined address (e.g., e-mail address, telephone number, fax number, screen name, etc.). The notification may also identify whether the user device is currently indoors or outdoors. In some embodiments, the notification may identify an inferred activity being performed by the user of the device. For example, FIG. 10 illustrates exemplary notification text message 1000 that identifies the current location of a mobile device (or the user of the mobile device) as "Springfield Baseball Stadium", and includes a map 1001 indicating the current location 1002 of the user/device 1002. The text message also indicates that the user is currently "outdoors", identifies an inferred activity ("watching a baseball game") being performed by the user at the current location, and includes a link to directions from the current location of the text message recipient to the current location of the user device being tracked. Similarly, FIG. 10 also illustrates exemplary notification text message 1100 that identifies the current location of a mobile device (or the user of the mobile device) as "Pete's Bowling Alley", and includes a map 1101 indicating the current location 1102 of the user/device 1002. The text message also indicates that the user is currently "indoors", and includes a link to directions from the current location of the text message recipient to the current location of the user device being tracked. The notifications described herein may be set up so that they are transmitted at a predetermined time, or at predetermined time intervals, or in relation to the timing of a specific event (e.g., one hour before a particular flight lands, one hour after a particular baseball game ends).

According to various exemplary embodiments, the determination module 204 is configured to utilize the aforementioned techniques in conjunction with any known geo-location techniques (e.g., global positioning system (GPS), Wi-Fi positioning systems, Internet Protocol (IP) positioning systems, etc.), in order to determine the current location of the user device with a high degree of accuracy. For example, in various embodiments described above, the determination module 204 is able to determine that the user device is located either indoors or outdoors proximate to a particular audio source (e.g., a church, a stadium, an arena, a restaurant, etc.). Consistent with various embodiments, the determination module 204 may utilize conventional geo-location techniques to estimate the general location of the user device (e.g., city, town, village, suburb, street address, latitude and longitude, etc.) and determine various points of interest (e.g., churches, stadiums, arenas, restaurants, etc.) near the estimated position of the user device. By comparing the various points of interest near the user device to the audio sample source of the ambient noise signal detected by the user device, the determination module 204 is able to determine the current location of the user device to a high degree of accuracy.

Figure 5:
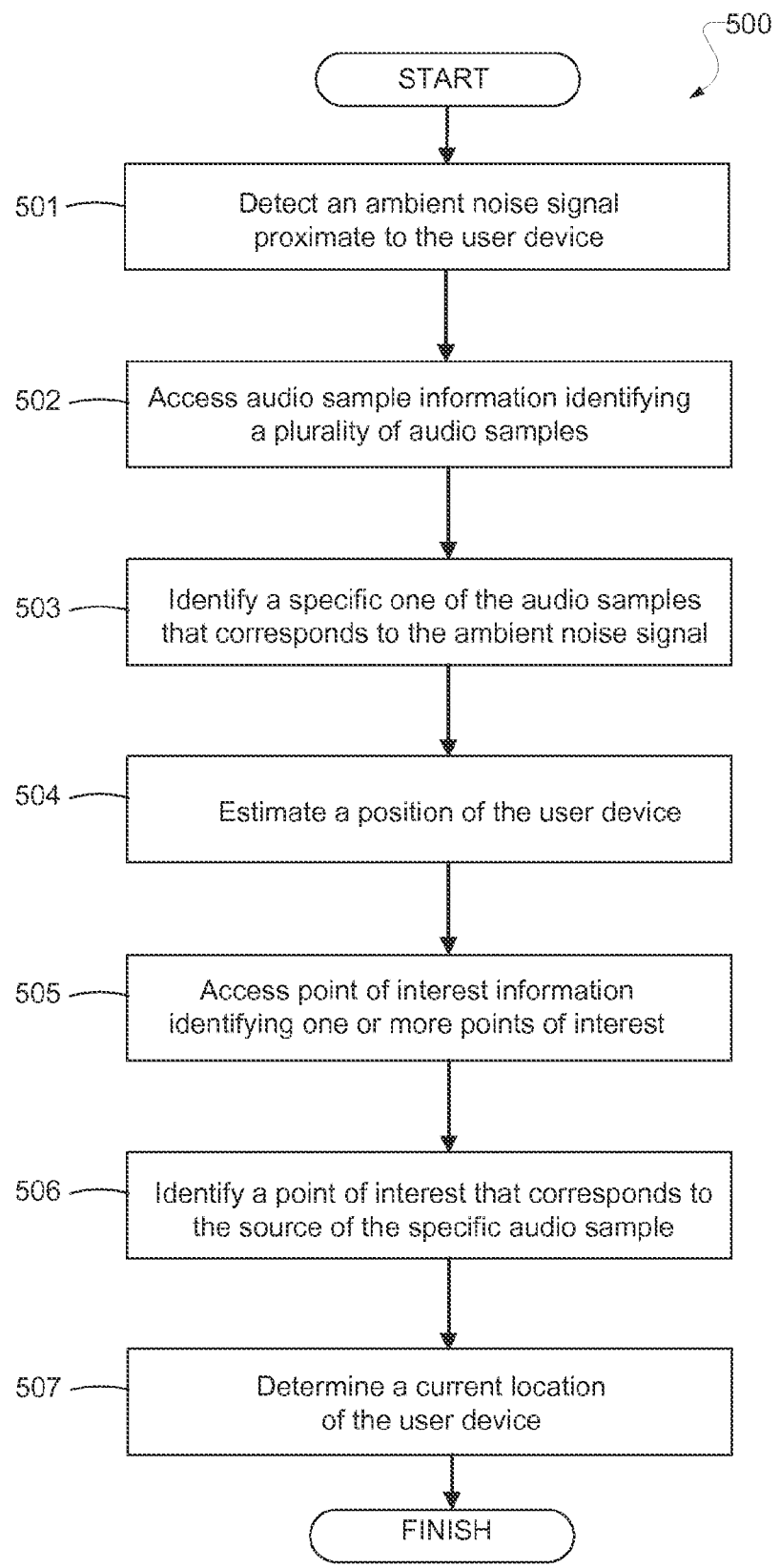
FIG. 5 is a flowchart illustrating an example method, according to various embodiments.

For example FIG. 5 is a flowchart illustrating an example method 500, consistent with various embodiments described above. The method 500 may be performed at least in part by, for example, the device location system 200 illustrated in FIG. 2 (or an apparatus having similar modules, such as client machines 110 and 112 or application server 118 illustrated in FIG. 1). Operations 501-503 in the method 500 are similar to operations 301-303 in the method 300 (see FIG. 3). In operation 501, the microphone 202 detects an ambient noise signal proximate to a user device, such as the ambient sound of a baseball game. In operation 502, the determination module 204 accesses audio sample information identifying various audio samples and, for each of the audio samples, a source of the corresponding audio sample. In operation 503, the determination module 204 identifies, from the audio sample information accessed in operation 502, a specific audio sample that corresponds to or matches the ambient noise signal detected in operation 501. For example, the determination module 204 may identify an audio sample of a baseball game that matches the ambient sound of the baseball game detected in operation 501. As described in various embodiments, the audio sample information may identify a corresponding source of the matching audio sample. For example, the audio sample information may identify the source of the matching audio sample of the baseball game as a "baseball stadium".

In operation 504, the determination module 204 estimates, based on GPS coordinates or a Wi-Fi positioning system of the user device, a position of the user device. For example, the determination module 204 may estimate, based on conventional GPS coordinates or a Wi-Fi positioning system, that the user device is currently located in a given state, city, town, village, suburb, or at a given street address, latitude and longitude, and so on. In operation 505, the determination module 204 accesses point of interest information identifying one or more points of interest at or proximate to the estimated position that was estimated in operation 504. For example, FIG. 6 illustrates exemplary point of interest information 600 that identifies various specific points of interest (e.g., facilities, establishments, businesses, venues, etc.), and the locations of these points of interest. Accordingly, the determination module 204 may access point of interest information 600 identifying points of interest located near the estimated position of the user device. The exemplary point of interest information 600 may be stored locally at, for example, the database 206 illustrated in FIG. 2, or may be stored remotely at a database, data repository, storage server, etc., that is accessible by the device location system 200 via a network (e.g., the Internet).

Referring back to the method 500 in FIG. 5, in operation 506, the determination module 204 identifies a specific point of interest (from the point of interest information accessed in operation 505) that corresponds to or matches the source of the matching audio sample (that was identified in operation 503). Using the example described above, the determination module 204 may identify a specific point of interest in the point of interest information 600 (see FIG. 6) that is near the device and that matches the source of "baseball stadium" (which is source of the ambient sound of the baseball game that was detected in operation 501). Thus, with reference to the point of interest information 600, the determination module 204 will identify Springfield Stadium at location [x8, y8] as the point of interest that matches the source of the detected audio sample. In operation 507, the determination module 204 determines a current location of the user device, based on the point of interest that was identified in operation 506. For example, since the point of interest identified in operation 506 was Springfield Stadium located at [x8, y8], the determination module 204 will determine that the current location of the user device is Springfield Stadium, [x8, y8]. Various operations in the method 500 may be omitted or rearranged, as necessary. For example, the operations 504 and/or 505 may occur before any of operations 501-503.

According to various exemplary embodiments, the determination module 204 may narrow down the amount of audio sample information for the purposes of detecting a match with an ambient noise signal, based on an estimated position of the user device (e.g., estimated based on conventional geo-location techniques, such as GPS or a Wi-Fi positioning system). For example, if the determination module 204 estimates the current position of the user device, and determines points of interest located near the user device, then the determination module 204 may access audio sample information for a subset of audio samples having sources corresponding to these points of interest. Thereafter, the determination module 204 may compare any detected ambient noise signal with this subset of audio samples. Thus, the determination module 204 may avoid performing a pattern matching process between the detected ambient noise signal and a large number of audio samples.

Figure 7:
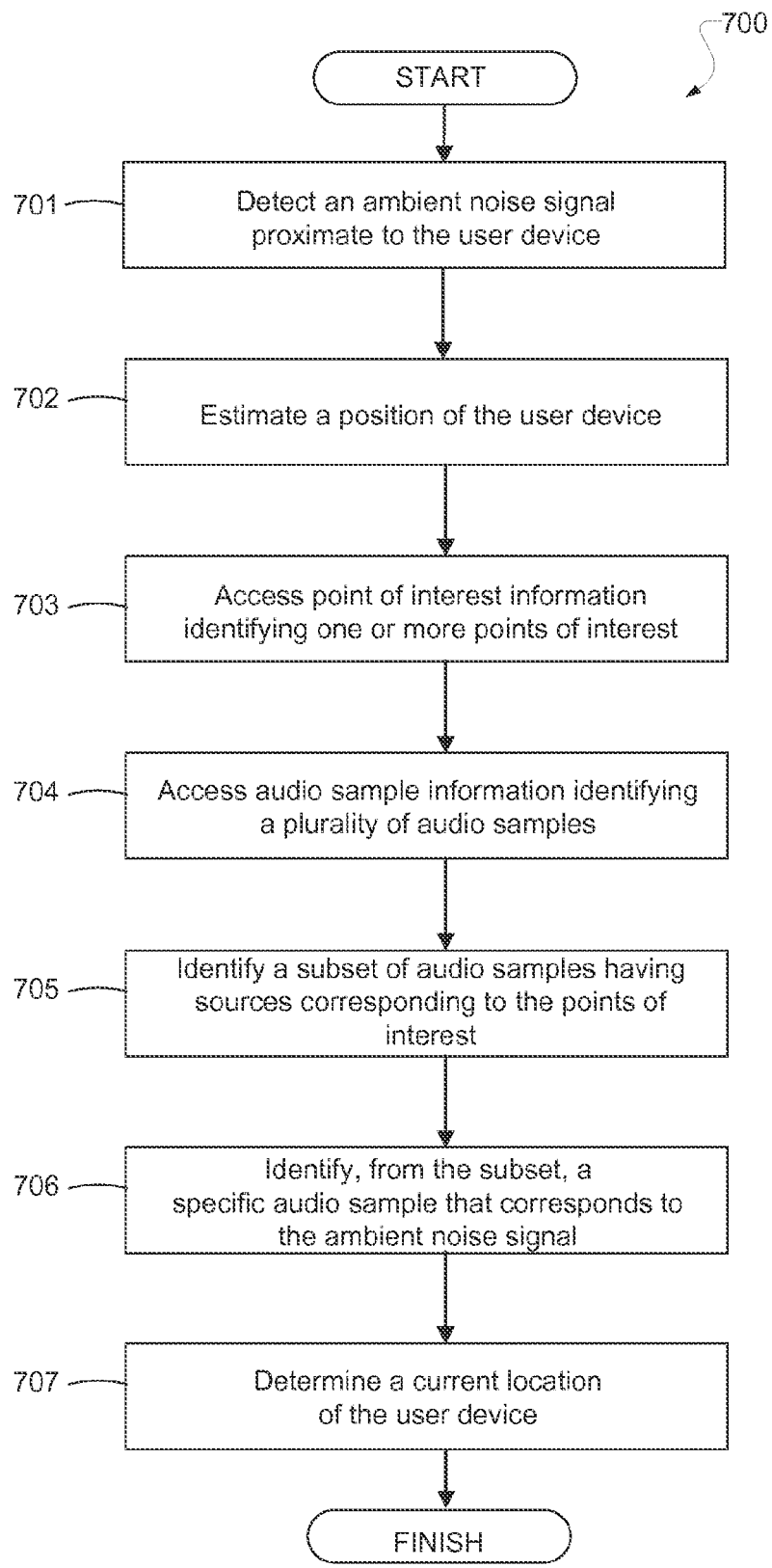
FIG. 7 is a flowchart illustrating an example method, according to various embodiments.

For example, FIG. 7 is a flowchart illustrating an example method 700, consistent with various embodiments described above. The method 700 may be performed at least in part by, for example, the device location system 200 illustrated in FIG. 2 (or an apparatus having similar modules, such as client machines 110 and 112 or application server 118 illustrated in FIG. 1). In operation 701, the microphone 202 detects an ambient noise signal proximate to a user device. For example, if the user device is located near a bowling alley in a strip mall, the microphone 202 may detect an ambient noise signal corresponding to a game of bowling that is being played near the user device. In operation 702, the determination module 204 estimates, based on geo-location information, a position of the user device. For example, the determination module 204 may estimate, based on conventional GPS coordinates or a Wi-Fi positioning system, that the user device is currently located at a given street address, latitude and longitude, or in a given state, city, town, village, suburb, and so on. In operation 703, the determination module 204 accesses point of interest information identifying points of interest at or proximate to the estimated position of the user device. For example, FIG. 6 illustrates exemplary point of interest information 600 identifying various specific points of interest (e.g., facilities, establishments, businesses, venues, etc.), and the locations of these points of interest. Thus, if the determination module 204 estimates that the user device is located near, for example, a strip mall, the determination module 204 may access point of interest information 600 identifying shops in the strip mall that are located near the user device.

In operation 704, the determination module 204 accesses audio sample information identifying a plurality of audio samples and, for each of the audio samples, a source of the corresponding audio sample. For example, see the audio sample information 400 illustrated in FIG. 4. In operation 705, the determination module 204 identifies a subset of audio samples having sources corresponding to the points of interest near the estimated position of the user device. For example, if a bowling alley or restaurants of a strip mall are located near the user device, then the determination module 204 may identify an audio sample of a bowling alley source or an audio sample of a restaurant source from the audio sample information. In operation 706, the determination module 204 identifies, from the subset of audio samples identified in operation 705, a specific audio sample that corresponds to or matches the ambient noise signal detected in operation 701. For example, the determination module 204 may identify the audio sample of a bowling alley as matching the ambient noise of the game of bowling that was detected in operation 701. In operation 707, the determination module 204 determines a current location of the user device, based on the point of interest that corresponds to the matched audio sample. For example, if the ambient noise signal of the game of bowling matches the audio sample from the "bowling alley" source, the determination module 204 may determine that the user device is located inside the bowling alley at [x6, y6] in the strip mall (e.g., see point of interest information 600 and FIG. 6). Various operations in the method 700 may be omitted or rearranged, as necessary. For example, operation 704 may occur before any of operations 701-703. As another example, operation 701 may occur before operation 706 and after any of operations 702-705.

Figure 8:
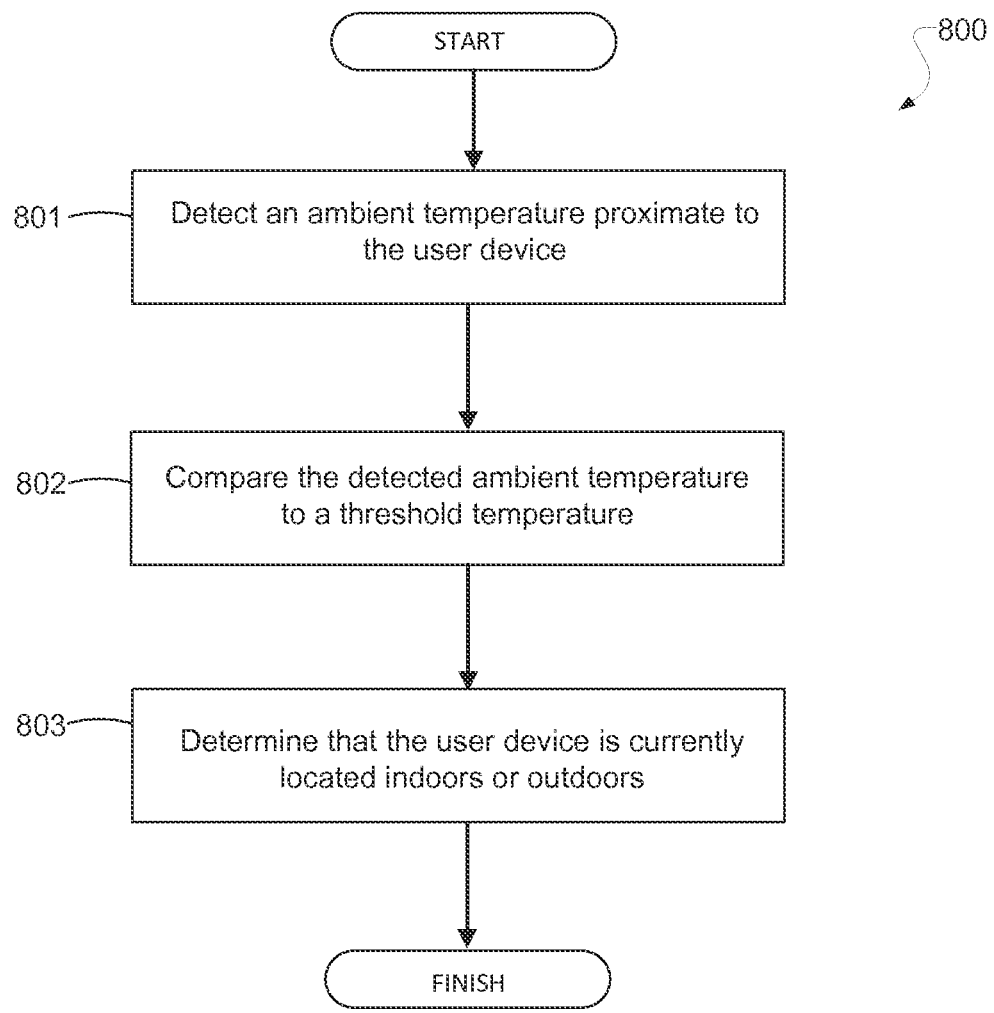
FIG. 8 is a flowchart illustrating an example method, according to various embodiments.
Figure 9:
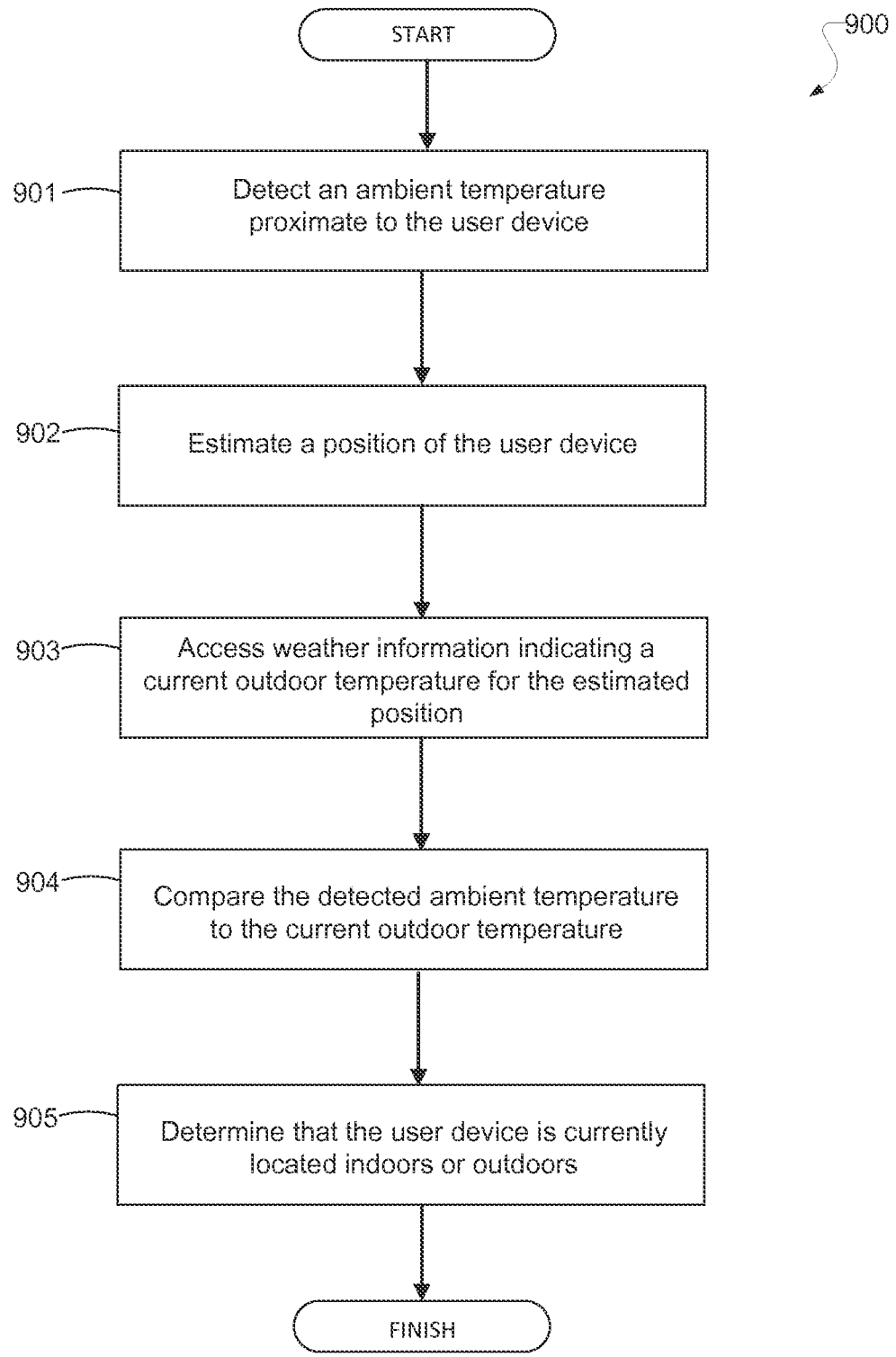
FIG. 9 is a flowchart illustrating an example method, according to various embodiments.

According to various exemplary embodiments described in conjunction with FIGS. 8 and 9, a temperature sensor of a user device may be utilized to help determine a current location of the user device. For example, if the temperature sensor detects a moderate temperature that may be expected within an indoor environment, then the device location system 200 may determine that the user device is currently located indoors. In contrast, if the temperature sensor detects a more extreme temperature (e.g., a high temperature or a low temperature) that may be expected from an outdoor environment, then the device location system 200 may determine that the user device is currently located outdoors.

For example, FIG. 8 is a flowchart illustrating an example method 800, consistent with various embodiments described above. The method 800 may be performed at least in part by, for example, the device location system 200 illustrated in FIG. 2 (or an apparatus having similar modules, such as client machines 110 and 112 or application server 118 illustrated in FIG. 1). In operation 801, the temperature sensor 203 detects an ambient temperature proximate to the user device. The temperature sensor 203 may correspond to any type of temperature sensor known to those skilled in the art. In operation 802, the determination module 204 compares the detected ambient temperature to one or more temperature thresholds. For example, the thresholds may specify an expected room temperature range (e.g., 65° F. to 75° F.). In operation 803, the determination module 204 determines that the user device is currently located indoors or outdoors, based on the comparison in operation 802. For example, if the ambient temperature detected in operation 801 is within the expected room temperature range (e.g., 65° F. to 75° F.), then the determination module 204 may determine that the user device is currently located indoors. On the other hand, if the ambient temperature detected in operation 801 is outside the expected room temperature range, then the determination module 204 may determine that the user device is currently located outdoors.

According to various exemplary embodiments, the device location system 200 may also access weather information indicating the current reported outdoor temperature for an estimated position of the user device (e.g., current weather report for a city, suburb, or postal code where the user device is located) in order to accurately determine whether the user device is currently located indoors or outdoors.

For example, FIG. 9 is a flowchart illustrating an example method 900, consistent with various embodiments described above. The method 900 may be performed at least in part by, for example, the device location system 200 illustrated in FIG. 2 (or an apparatus having similar modules, such as client machines 110 and 112 or application server 118 illustrated in FIG. 1). In operation 901, the temperature sensor 203 detects an ambient temperature proximate to the user device. The temperature sensor 203 may correspond to any type of temperature sensor known to those skilled in the art. In operation 902, the determination module 204 estimates, based on geo-location information, a position of the user device. For example, the determination module 204 may estimate, based on conventional GPS coordinates or a Wi-Fi positioning system, that the user device is currently located at a given street address, latitude and longitude, or in a given state, city, town, village, suburb, and so on. In operation 903, the determination module 204 accesses weather information indicating a current outdoor temperature for the estimated position of the user device. For example, if the GPS coordinates obtained from the user device indicates that the user device is located in area code 48104 (Ann Arbor, Mich.), then the determination module 204 will access current weather information for area code 48104. For example, the current weather information for area code 48104 may indicate a current reported outdoor temperature of 20° F. during winter months, or may indicate a current reported outdoor temperature of 90° F. during summer months. In operation 904, the determination module 204 compares the ambient temperature detected in operation 901 to the current reported outdoor temperature accessed in operation 903. In operation 905, the determination module 204 determines that the user device is currently located indoors or outdoors, based on the comparison in operation 904. For example, if the ambient temperature detected in operation 901 is 65° F. and the current reported outdoor temperature is 20° F., then the determination module 204 may determine that the ambient temperature is significantly higher than the current reported outdoor temperature. Accordingly, the determination module 204 may determine that the user device is located indoors. On the other hand, if the ambient temperature detected in operation 901 is 22° F. and the current reported outdoor temperature is 20° F., then the determination module 204 may determine that the ambient temperature is approximately equal to the current reported outdoor temperature. Accordingly, the determination module 204 may determine that the user device is located outdoors.

Various embodiments described throughout may be combined. For example, according to various exemplary embodiments, the location of the user device may be determined based on both an ambient noise signal detected by a microphone of the user device and an ambient temperature detected by a temperature sensor of the device. For example, various embodiments described in conjunction with FIG. 8 or 9 may be performed in conjunction with various embodiments described in conjunction with FIG. 3, 5, or 7.

Example Mobile Device

Figure 11:
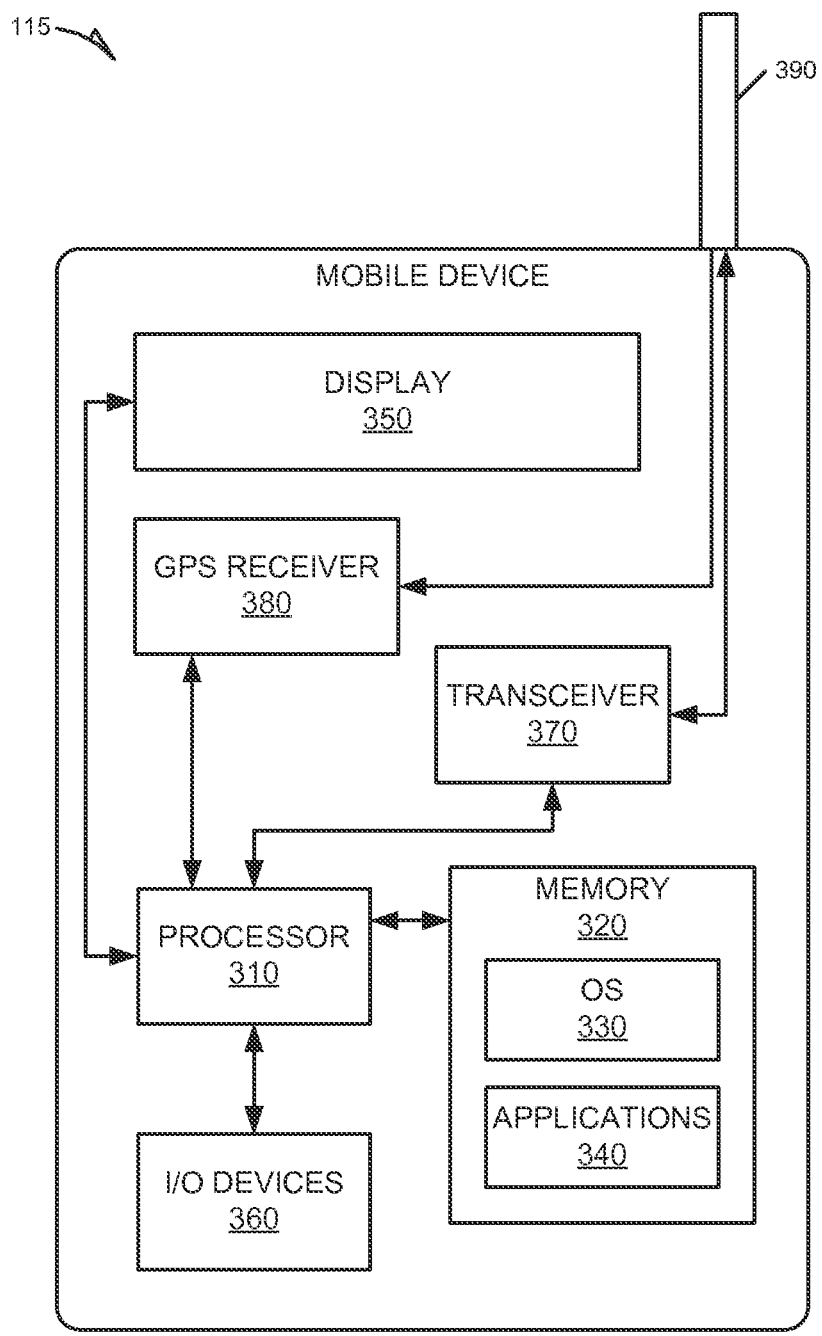
FIG. 11 illustrates an exemplary mobile device, according to various embodiments.

FIG. 11 is a block diagram illustrating a mobile device 115, according to an example embodiment. The mobile device 115 may correspond to, for example, the client machines 110, 112 illustrated in FIG. 1. The mobile device 115 may include a processor 310. The processor 310 may be any of a variety of different types of commercially available processors suitable for mobile devices (for example, an XScale architecture microprocessor, a Microprocessor without Interlocked Pipeline Stages (MIPS) architecture processor, or another type of processor). A memory 320, such as a Random Access Memory (RAM), a Flash memory, or other type of memory, is typically accessible to the processor. The memory 320 may be adapted to store an operating system (OS) 330, as well as application programs 340, such as a mobile location enabled application that may provide LBSs to a user. The processor 310 may be coupled, either directly or via appropriate intermediary hardware, to a display 350 and to one or more input/output (I/O) devices 360, such as a keypad, a touch panel sensor, a microphone, and the like. Similarly, in some embodiments, the processor 310 may be coupled to a transceiver 370 that interfaces with an antenna 390. The transceiver 370 may be configured to both transmit and receive cellular network signals, wireless data signals, or other types of signals via the antenna 390, depending on the nature of the mobile device 115. Further, in some configurations, a GPS receiver 380 may also make use of the antenna 390 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 12:
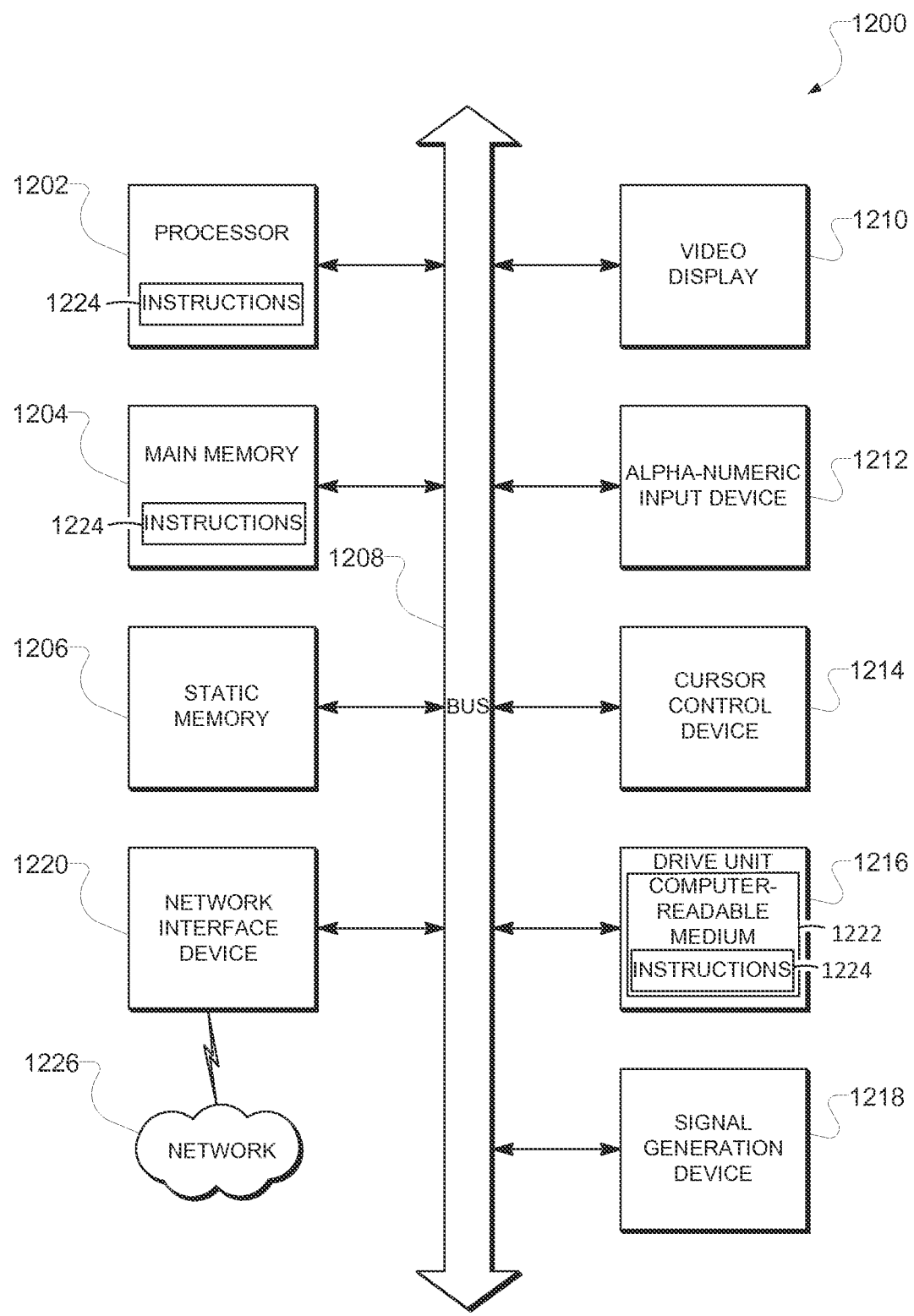
FIG. 12 is a diagrammatic representation of a machine in the example form of a computer system within which a set of instructions, for causing the machine to perform any one or more of the methodologies discussed herein, may be executed.

FIG. 12 is a block diagram of machine in the example form of a computer system 1200 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard or a touch-sensitive display screen), a user interface (UI) navigation device 1214 (e.g., a mouse), a disk drive unit 1216, a signal generation device 1218 (e.g., a speaker) and a network interface device 1220.

Machine-Readable Medium

The disk drive unit 1216 includes a machine-readable medium 1222 on which is stored one or more sets of instructions and data structures (e.g., software) 1224 embodying or utilized by any one or more of the methodologies or functions described herein. The instructions 1224 may also reside, completely or at least partially, within the main memory 1204 and/or within the processor 1202 during execution thereof by the computer system 1200, the main memory 1204 and the processor 1202 also constituting machine-readable media.

While the machine-readable medium 1222 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1224 may further be transmitted or received over a communications network 1226 using a transmission medium. The instructions 1224 may be transmitted using the network interface device 1220 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMAX networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
   detecting, using a microphone of a user device, an ambient noise signal proximate to the user device;
   accessing audio sample information identifying a plurality of audio samples and, for each of the audio samples, a source of the corresponding audio sample;
   identifying, from the audio sample information, a specific one of the audio samples that corresponds to the ambient noise signal;
   determining, using one or more hardware processors, a current location of the user device, based on the source of the specific audio sample;
   detecting, using a temperature sensor of the user device, an ambient temperature proximate to the user device;
   estimating, based at least in part on global positioning system information, a position of the user device;
   accessing weather information indicating a current outdoor temperature for the estimated position of the user device;
   comparing the detected ambient temperature to the current outdoor temperature; and
   determining that the user device is currently located indoors or outdoors, based on the comparison.

2. The method of claim 1, wherein the determining of the current location of the user device further comprises:
   accessing point of interest information identifying one or more points of interest at or proximate to the estimated position,
   wherein the current location of the user device is determined by identifying a specific one of the points of interest that corresponds to the source of the specific audio sample.

3. The method of claim 1, further comprising:
   accessing point of interest information identifying one or more points of interest at or proximate to the estimated position; and
   identifying, from the audio sample information, a subset of audio samples having sources corresponding to the points of interest,
   wherein the specific audio sample is identified from the subset of audio samples.

4. The method of claim 1, wherein the audio sample information identifies the source of each of the audio samples as any one of an indoor location and an outdoor location.

5. The method of claim 4, wherein the determining comprises:
   determining that the current location of the user device is any one of the indoor location and the outdoor location.

6. The method of claim 1, further comprising:
   transmitting a notification identifying the current location of the user device to a predetermined address.

7. The method of claim 6, wherein the notification is any one of an email, a text message, and an instant message.

8. An apparatus comprising:
   a microphone configured to detect an ambient noise signal proximate to a user device;
   a temperature sensor configured to detect an ambient temperature proximate to the user device; and
   a determination module implemented by one or more hardware processors and configured to:
      access audio sample information identifying a plurality of audio samples and, for each of the audio samples, a source of the corresponding audio sample;
      identify, from the audio sample information, a specific one of the audio samples that corresponds to the ambient noise signal;
      determine a current location of the user device, based on the source of the specific audio sample;
      estimate, based at least in part on global positioning system information, a position of the user device;
      access weather information indicating a current outdoor temperature for the estimated position of the user device;
      compare the detected ambient temperature to the current outdoor temperature; and
      determine that the user device is currently located indoors or outdoors, based on the comparison.

9. The apparatus of claim 8, wherein the determination module is further configured to:
   access point of interest information identifying one or more points of interest at or proximate to the estimated position,
   wherein the current location of the user device is determined by identifying a specific one of the points of interest that corresponds to the source of the specific audio sample.

10. The apparatus of claim 8, wherein the determination module is further configured to:
    access point of interest information identifying one or more points of interest at or proximate to the estimated position; and
    identify, from the audio sample information, a subset of audio samples having sources corresponding to the points of interest,
    wherein the specific audio sample is identified from the subset of audio samples.

11. The apparatus of claim 8, wherein the audio sample information identifies the source of the audio sample as any one of an indoor location and an outdoor location.

12. The apparatus of claim 11, wherein the determination module is further configured to:
    determine that the current location of the user device is any one of the indoor location and the outdoor location, based at least in part on the audio sample information.

13. The apparatus of claim 8, further comprising:
    a notification module configured to transmit a notification identifying the current location of the user device to a predetermined address.

14. The apparatus of claim 13, wherein the notification is any one of an email, a text message, and an instant message.

15. A non-transitory machine-readable storage medium having embodied thereon instructions executable by one or more machines to perform operations comprising:
   detecting, using a microphone of a user device, an ambient noise signal proximate to the user device;
   accessing audio sample information identifying a plurality of audio samples and, for each of the audio samples, a source of the corresponding audio sample;
   identifying, from the audio sample information, a specific one of the audio samples that corresponds to the ambient noise signal;
   determining a current location of the user device, based on the source of the specific audio sample;
   detecting, using a temperature sensor of the user device, an ambient temperature proximate to the user device;
   estimating, based at least in part on global positioning system information, a position of the user device;
   accessing weather information indicating a current outdoor temperature for the estimated position of the user device;
   comparing the detected ambient temperature to the current outdoor temperature; and
   determining that the user device is currently located indoors or outdoors, based on the comparison.

16. The non-transitory machine-readable storage medium of claim 15, wherein the operations further comprise:
   accessing point of interest information identifying one or more points of interest at or proximate to the estimated position,
   wherein the current location of the user device is determined by identifying a specific one of the points of interest that corresponds to the source of the specific audio sample.

\* \* \* \* \*